(12) United States Patent
Lo et al.

(10) Patent No.: US 10,740,386 B2
(45) Date of Patent: Aug. 11, 2020

(54) MULTI-STAGE IMAGE MATCHING TECHNIQUES

(71) Applicant: MorphoTrak, LLC, Anaheim, CA (US)

(72) Inventors: Peter Zhen-Ping Lo, Mission Viejo, CA (US); Hui Zhu, Anaheim, CA (US); Hui Chen, Foothill Ranch, CA (US); Jianguo Wang, Diamond Bar, CA (US)

(73) Assignee: MorphoTrak, LLC, Anaheim, CA (US)

( * ) Notice: Subject to any disclaimer, the term of this patent is extended or adjusted under 35 U.S.C. 154(b) by 69 days.

(21) Appl. No.: 16/191,544

(22) Filed: Nov. 15, 2018

(65) Prior Publication Data
US 2019/0205433 A1 Jul. 4, 2019

Related U.S. Application Data

(60) Provisional application No. 62/612,038, filed on Dec. 29, 2017.

(51) Int. Cl.
*G06F 17/30* (2006.01)
*G06F 16/583* (2019.01)
(Continued)

(52) U.S. Cl.
CPC .......... *G06F 16/5838* (2019.01); *G06F 16/51* (2019.01); *G06F 16/532* (2019.01); *G06F 16/583* (2019.01); *G06K 9/6215* (2013.01)

(58) Field of Classification Search
CPC .. G06F 16/5838; G06F 16/583; G06F 16/532; G06F 16/51; G06K 9/6215; G06K 9/6228; G06K 9/6211
See application file for complete search history.

(56) References Cited

U.S. PATENT DOCUMENTS

2008/0273767 A1  11/2008  Lo et al.
2015/0078629 A1*  3/2015  Gottemukkula ..... G06K 9/0061
382/117
(Continued)

OTHER PUBLICATIONS

Lowe, "Distinctive image features from scale-invariant keypoints", International Journal of Computer Vision 60(2), dated Jan. 5, 2004, 28 pages.
(Continued)

*Primary Examiner* — Yon J Couso
(74) *Attorney, Agent, or Firm* — Fish & Richardson P.C.

(57) ABSTRACT

In some implementations, an image recognition system is capable of using an iterative multi-stage image matching procedure to improve the accuracy and/or reliability of matching a search image with a small number of distinctive feature points to reference images. In the first stage, the system compares a search template for the search image to reference templates of each image within the set of reference images. The system determines a best-matched reference image from among the reference images of the set of reference images. In the second stage, the system compares the hybrid search template to one or more reference templates of reference images that is not the best-matched reference image. The comparison can be used to either compute match scores for reference images corresponding to the one or more reference templates.

20 Claims, 9 Drawing Sheets

(51) Int. Cl.
*G06K 9/62* (2006.01)
*G06F 16/51* (2019.01)
*G06F 16/532* (2019.01)

(56) References Cited

U.S. PATENT DOCUMENTS

| | | | | |
|---|---|---|---|---|
| 2016/0012317 | A1* | 1/2016 | Mayle | G06K 9/4671 382/159 |
| 2016/0012595 | A1* | 1/2016 | Romanik | G06T 7/73 382/203 |
| 2018/0075282 | A1* | 3/2018 | Chen | G06K 9/00067 |
| 2019/0147289 | A1* | 5/2019 | Glover | G06K 9/6255 382/218 |

OTHER PUBLICATIONS

Kitti et al., "An Object Recognition and Identification System Using the Harris Corner Detection Method", International Journal of Machine Learning and Computing, vol. 2, No. 4, dated Aug. 2012, 4 pages.

Arora et al., "Latent fingerprint matching: performance gain via feedback from exemplar prints," IEEE Transactions on Pattern Analysis and Machine Intelligence, 36(12): 2452-65, dated Dec. 2014, 14 pages.

* cited by examiner

MULTI-STAGE IMAGE MATCHING TECHNIQUES

CROSS-REFERENCE TO RELATED APPLICATIONS

This application claims the benefit of U.S. Provisional Patent Application No. 62/612,038 filed on Dec. 29, 2017 and titled "MULTI-STAGE IMAGING TECHNIQUES," which is incorporated herein by reference in its entirety.

FIELD

The present specification relates generally to image recognition systems.

BACKGROUND

Image recognition systems are commonly used in many contexts to efficiently identify matching objects between two or more images. Such systems often extract and compare distinctive features from the images to identify corresponding features within images. For example, fingerprint images can be compared and make an identification or verification decision based on comparing extracted minutiae. As another example, tattoo images can be compared to determine that two images either include the same tattoo present on a target's skin, or related tattoos of targets that have some affiliation represented by the related tattoos. In such examples, an image recognition system extracts color and/or grayscale characteristics from a search image and compares the extracted features to those of a set of previously collected reference images.

SUMMARY

Image recognition systems often identify a pair of matching images, e.g., a search image and a reference image, based on comparing distinctive feature points of the search image and the reference image and computing, for example, a match score representing a correspondence between the distinctive feature points of the search image and reference image. The value of the match score can be used to represent the degree of similarity between the search image and the reference image. For example, an image recognition system can determine that a reference image represents a match candidate for a search image based on the match score of the reference image satisfies a predetermined threshold of similarity.

Matching performance of many image recognition systems are often susceptible to various factors, such as image quality. For example, because low quality search images often have a limited number of distinctive feature points, matching operations performed by many image recognition systems for low quality search images are often inaccurate and/or unreliable. This is because many image recognition systems often use distinctive feature points as a basis to identify match candidates that have corresponding feature points. In some instances, if a small number of distinctive feature points of a search image are used in a matching operation, then many image recognition systems may compute inaccurate match scores for reference images. For example, many image recognition systems often identify false positive match candidates if the search distinctive feature points are based on a distorted search image and/or only partial representative of the visual attributes of an object appears in the search image. As another example, many image recognition systems often fail to properly identify an actual matching image as a match candidate if the distinctive features of the matching image is not present within a low quality search image.

In some implementations, an image recognition system is capable of using an iterative multi-stage image matching procedure to improve the accuracy and/or reliability of matching a search image with a small number of distinctive feature points to reference images. In the first stage, the system compares a search template for the search image to reference templates of each image within the set of reference images. The system determines a best-matched reference image from among the reference images of the set of reference images. For example, the best-matched reference image can be an image that is most likely to include the same object as an object included in the search image. As another example, the best-matched reference image can be an image that is most likely to have visual attributes that are similar to the visual attributes of the search image. The system then combines reference feature points from the best-matched reference image and search feature points from the search image to generate a hybrid search template that is used in a subsequent matching stage.

In the second stage, the system compares the hybrid search template to one or more reference templates of reference images that is not the best-matched reference image in the first stage. For example, the reference images used in the second stage can represent other reference images included in the set of reference images used in the first stage, or alternatively, new reference images that are obtained from a different set of reference images. The comparison can be used to either compute match scores for reference images corresponding to the one or more reference templates. Alternatively, the system can use the comparison to generate a new hybrid search template to be used in a subsequent matching stage. In this regard, the system can iteratively generate a hybrid search template at each respective matching stage that is then used to perform comparisons to other reference images in a subsequent matching stage.

The iterative matching technique discussed herein can provide various advantages when matching a search image to a set of reference images. For example, if the search image is a low quality image with a limited number of distinctive feature points, generating a hybrid search template allows the system, at a subsequent matching stage, to use a greater number of feature points to identify a match candidate. In this regard, while a single stage matching operation of a low quality search image can produce inaccurate results due to the limited number of feature points used to perform matching, iteratively generating hybrid search templates based on similar reference images can be used to increase the number of distinctive feature points that are used for matching. The iterative matching techniques discussed herein can therefore be used to reduce false negative results due to a small number of search feature points that are included in a low quality search image.

The system is capable of using the iterative matching techniques in different types of matching operations based on generating different types of hybrid search templates. For instance, in a verification procedure, where matching is performed to identify, for example, a reference image as having the same object as an object included in the search image, the system generates the hybrid search template based on identifying a mated region between the search image and the best-matched reference image. The mated regions of the search and reference images can represent overlapping areas that have a number of coinciding distinctive features. For example, if four of six search feature points have four coinciding reference feature points, then an area of the search image defined by the four search feature points represents the mated region of the search image, and an area of the reference image defined by the four corresponding reference feature points represents the mated region of the reference image. Because distinctive feature points present in non-mated regions of the search and references images are not included in the hybrid search template, a higher sensitivity can be used to determine a match candidate using the hybrid search template at subsequent matching stages.

Alternatively, in an identification procedure, where matching is performed to identify, for example, a reference image that is generally similar to the search image, the system generates the hybrid search template based on combining all of the search feature points of the search image and all of the reference feature points of the best-matched reference image without regard for the images share a mated region. In such instances, the hybrid search template includes a greater number of distinctive feature points relative to a hybrid search template that is generated based on a mated region, which can be used to improve the likelihood of identifying a match candidate for the search image. Thus, this type of hybrid search template can be used, for example, if the search image is a low quality image that does not have enough distinctive feature points to reliably and/or accurately identify a matching image.

In one general aspect, a method can be performed by one or more computers. The method can include the operations of: obtaining a search template comprising (i) search feature points within a search image, and (ii) search descriptors for each of the search feature points; obtaining a set of reference templates, each reference template within the set of reference templates comprising (i) reference feature points within a particular reference image, and (ii) reference descriptors for each of the reference feature points; comparing the search template to each reference template within the set of reference templates; determining a best-matched reference template from among the set of reference templates based on comparing the search template to each reference template within the set of reference templates; combining one or more reference feature points of the best-matched reference template and one or more search feature points of the search template to generate a hybrid search template; comparing the hybrid search template to one or more reference templates that is not the best-matched reference template; computing a respective match score for one or more reference images corresponding to the one or more reference templates that is not the best-matched reference template based on comparing the hybrid search template to the one or more reference templates that is not best-matched reference template; and providing the match scores for the one or more reference images for output.

One or more implementation can include the following optional features. For example, in some implementations, comparing the search template to each reference template within the set of reference templates includes: comparing each search feature point of the search template to each reference feature point of each reference template within the set of reference templates; and determining, for each reference template within the set of reference templates, a number of mated feature points based on comparing each search feature point of the search template to each reference feature point of each reference template within the set of reference templates, each mated feature point representing a particular reference feature point having one or more reference descriptors that correspond to a search descriptor of a particular search feature point.

In some implementations, the best-matched reference template is a particular reference feature template that is determined to have the greatest number of mated feature points from among the reference templates within the set of reference feature templates.

In some implementations, the hybrid search template is generated based on combining each reference feature points of the best-matched reference template and each search feature point of the search template.

In some implementations, generating the hybrid search template includes: comparing each search feature point within the search image to each reference feature point within a reference image corresponding to the best-matched reference template. In such implementations, the method also includes determining a mated region of the reference image corresponding to the best-matched reference template based on comparing each search feature point within the search image to each reference feature point within the reference image corresponding to the best-matched reference template. In such implementations. Additionally, the mated region of the reference image is defined by an area of the reference image that includes reference feature points having one or more reference descriptors that correspond to a search descriptor of a particular search feature point.

In some implementations, generating the hybrid search template includes determining a mated region of the search image based on the mated region of the reference image. In such implementations, the mated region of the search image is defined by an area of the search image that includes search feature points having one or more search descriptors that correspond to a reference descriptor of a particular reference feature point. In such implementations, the method also includes combining search feature points included within the mated region of the search image and reference feature points included within the mated region of the reference image to generate the hybrid search template.

In some implementations, the one or more reference templates that is not best-matched reference template includes reference templates included within the set of reference templates that are compared to the search template.

In some implementations, the one or more reference templates that is not best-matched reference template includes reference templates included within a second set of reference templates. In such implementations, the second set of reference templates is associated with a different data source than a data source of the set of reference templates that are compared to the search template.

In some implementations, the search feature points or the reference feature points includes one or more of a ridge intersection point, a ridge edge point, or a corner point.

In some implementations, the search image includes an image of an object, and the search feature points include search feature points characterizing visual attributes of the object. In such implementations, the match scores each represent a likelihood that a reference image corresponding to the one or more reference templates is an image of the object.

In some implementations, the search image includes an image of a first object. In such implementations, the search feature points comprise search feature points characterizing visual attributes of the first object. The match scores, in such implementations, each represent a likelihood that a reference image corresponding to the one or more reference templates is an image of a second object that is predetermined to be similar to the first object.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1:
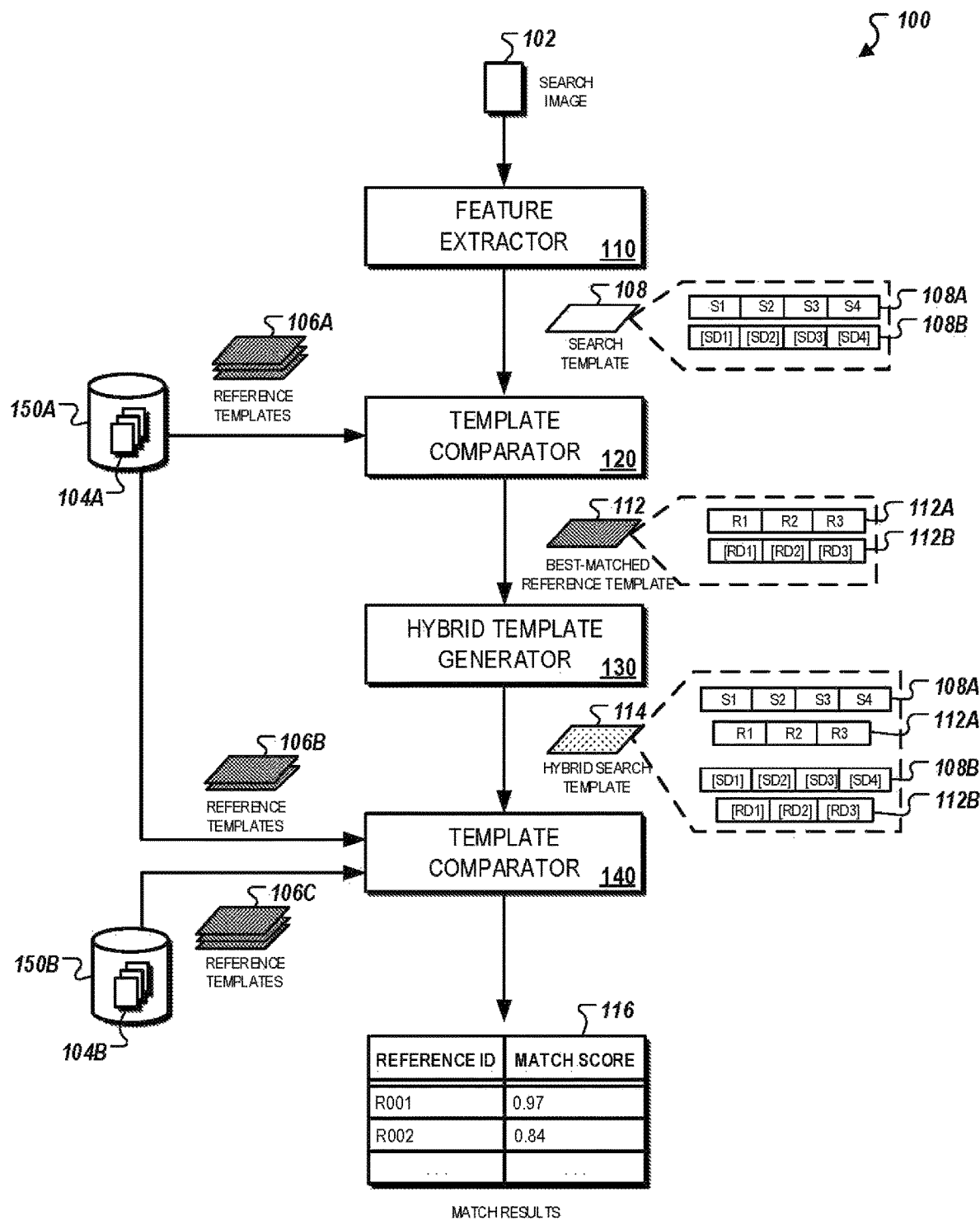
FIG. 1 is a diagram of an example of an image recognition system that performs multi-stage image matching operation to iteratively match a search image to multiple reference images.

In general, this specification describes an image recognition system that is capable of using an iterative multi-stage image matching procedure to improve the accuracy and/or reliability of matching a search image with a small number of distinctive feature points to reference images. In the first stage, the system compares a search template for the search image to reference templates of each reference image within the set of reference images. The system determines a best-matched reference image from among the reference images of the set of reference images. For example, the best-matched reference image can be an image that is most likely to include the same object as an object included in the search image. As another example, the best-matched reference image can be an image that is most likely to have visual attributes that are similar to the visual attributes of the search image. The system then combines reference feature points from the best-matched reference image and search feature points from the search image to generate a hybrid search template that is used in a subsequent matching stage.

In the second stage, the system compares the hybrid search template to one or more reference templates of reference images that is not the best-matched reference image. For example, the reference images used in the second stage can represent other reference images included in the set of reference images used in the first stage, or alternatively, new reference images that are obtained from a different set of reference images. The comparison can be used to either compute match scores for reference images corresponding to the one or more reference templates. Alternatively, the system can use the comparison to generate a new hybrid search template to be used in a subsequent matching stage. In this regard, the system can iteratively generate a hybrid search template at each respective matching stage that is then used to perform comparisons to other reference images in a subsequent matching stage.

As described throughout, "feature points" refer to points within an image (e.g., a search image or a reference image) that have distinctive attributes and/or features that enables their use in an image matching operation. For example, feature points of a search image (e.g., an image that is searched against other images) can be used to identify locations within a reference image (e.g., a stored image that is compared against a search image) that correspond to distinctive feature of an object included within the reference image. In other examples, feature points of an image can be used to identify distinctive regions of the image that may be used to identify other types of distinctive features (e.g., curves, edges, boundaries) that are deeply embedded within textures present within the image. In this regard, feature points within a particular image can be used to represent discriminative characteristics of the particular image or an object included within the particular image that is then used to identify near-identical or similar objects and/or images within a database of stored reference images.

As described throughout, "descriptors" refer to feature vectors that include attributes of the feature points within an image. The descriptors can include global or local features such as color, edge, shape, gradient, direction, and texture, which are invariant to translation, rotation and scale. For example, the descriptors can be scale invariant feature transform (SIFT) descriptors or speeded up robust feature (SURF) descriptors that are used for near-duplicate image detection and/or recognition. Other examples of descriptors include a local binary pattern (LBP) descriptor, an image patch, or a wavelet descriptor. For fingerprint images, the local minutia relationship, such as an octant feature vector (OFV), can also be considered as a descriptor for a minutia.

FIG. 1 is a diagram of an example of an image recognition system 100 that performs a multi-stage image matching operation to iteratively match a search image 102 to multiple reference images, such as reference templates 106A and 106B. The system 100 includes a feature extractor 110, a template comparator 120, a hybrid template generator 130, and a template comparator 140. The system 100 performs the matching operation to generate match results 116 that include match scores for reference templates.

In the example depicted in FIG. 1, the system 100 performs a two-stage matching operation. The first stage of the matching operation is executed by the template comparator 120, whereas the second stage of the matching operation is executed by the template comparator 140. Briefly, in the first stage of the matching operation, the feature extractor 110 generates a search template 108 for the search image 102. The template comparator 120 obtains reference templates 106A corresponding to the reference images 104A stored within a repository 150A. The template comparator 120 compares the search template 108 to each reference template within the reference templates 106A to identify a best-matched reference template or a set of best-matched reference templates 112 that meet a matched score threshold. The score threshold can be pre-determined from empirical study to ensure that any match score greater than the threshold is a match or considered as similar match. The hybrid generator 130 combines the search template 108 and the best-matched reference templates 112 to generate a hybrid search template 114, which is then used as a search image for the second stage of the matching operation.

In the second stage of the matching operation, the template comparator 140 compares the hybrid search template 114 to reference templates that is not the best-matched reference template 112, such as reference templates 106B and 106C. The template comparator 140 then computes match scores for each of the reference templates that are compared to the hybrid search template 114 to generate the match results 116.

Figure 4A:
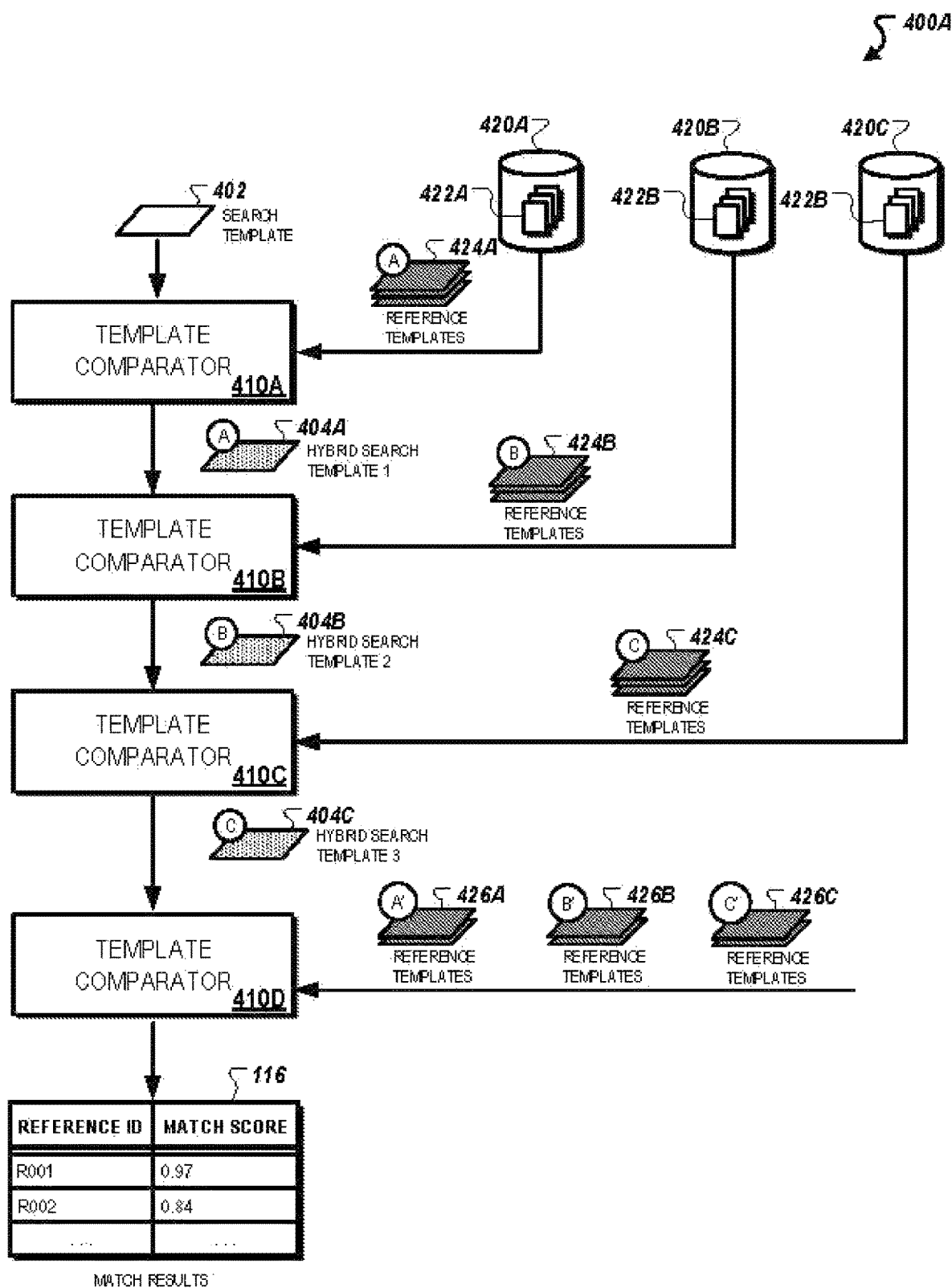
FIGS. 4A-4B are diagrams of examples of different architectures for multi-stage match matching operations.
Figure 4B:
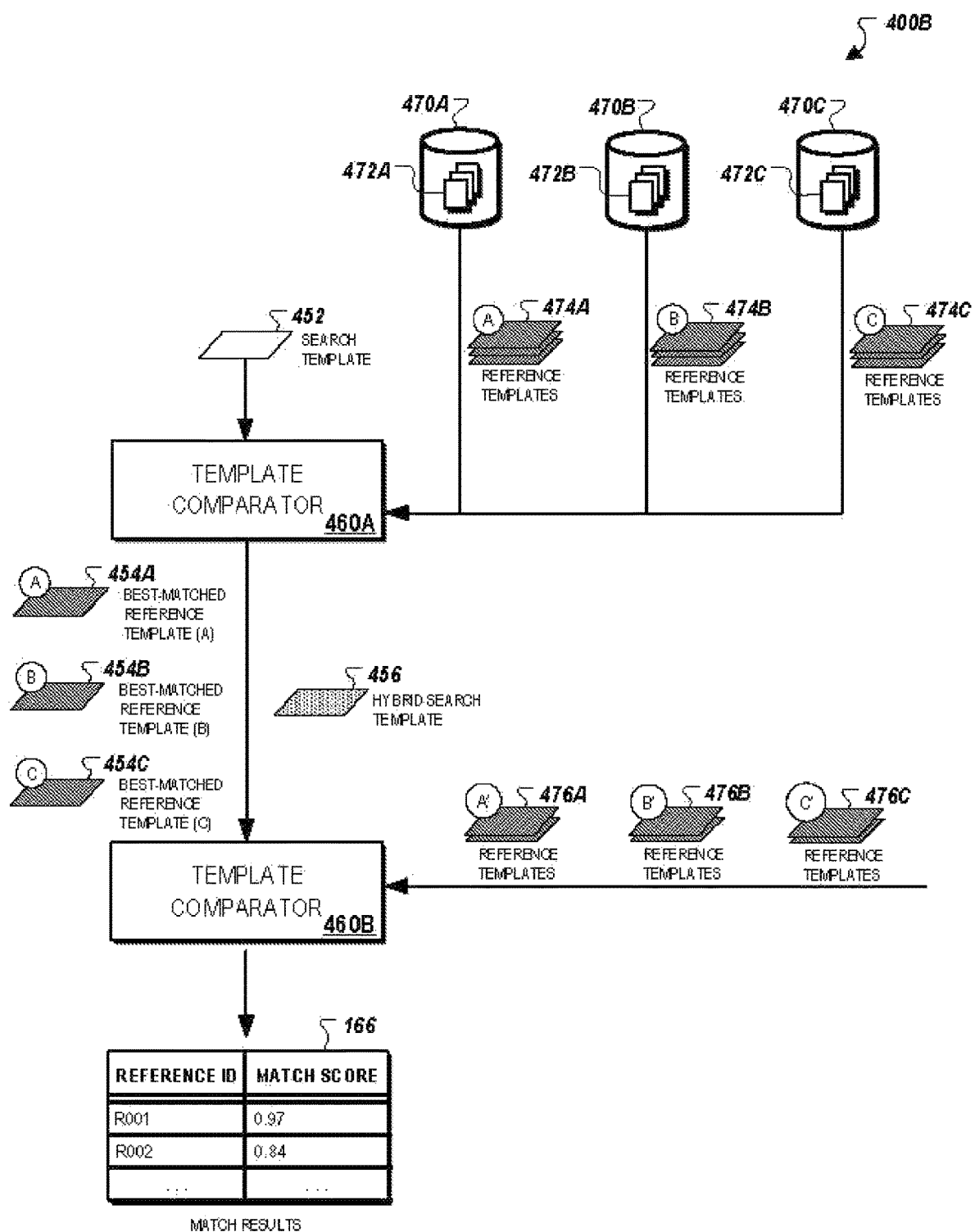

Although FIG. 1 depicts the template comparators 120 and 140 as distinct components, in some implementations, the first and second stages of the matching operation can be performed by the same component that performs template matching. For example, the template comparator 120 can perform the first stage matching operation to identify the best-matched reference template 112 and then compare the best-matched reference template 112 with the reference templates 106B and 106C to generate the match results 116. Additionally, while the example depicted in FIG. 1 is a two-stage matching operation, in other implementations, the system 100 is capable of performing matching operations with additional stages. For example, in such implementations, the system 100 can generate a new hybrid search template prior to the template comparison performed at each respective matching stage. In this regard, a different hybrid search template that is generated based on the matching results of the prior matching stage can be used as a search image to compare against other reference templates in a subsequent matching stage. Examples of different architectures for performing multi-stage matching operations are depicted in FIGS. 4A and 4B and discussed in more detail below.

In more detail, in the first matching stage, the feature extractor 110 initially generates the search template 108 for the search image 102. The search template 108 includes search feature points 108A that are identified by the feature extractor 110 as representing distinctive points within the search image 102. The search feature points 108A can include, for example, a ridge intersection point, a ridge end point, a corner point, or a half curvature point, a point having a local maximum intensity value, or a point having a local minimum intensive value. Each search feature point can be associated with a location within the search image 102, such as a coordinate location within an x-y coordinate axis of the search image 102 or a pixel location within a pixel array for the search image 102.

In certain applications where the search image 102 is a fingerprint image, a ten-print image, or a tattoo image, each search feature point can represent information associated with a key point detected within the search image 102. For example, each search feature point can represent major features of a detected fingerprint within the search image 102 that are used in comparisons to fingerprints in the reference images 104A to determine a fingerprint match. Common types of minutiae can include a ridge ending, a ridge bifurcation, a short ridge, an island, a ridge enclosure, a spur, a crossover or bridge, a delta, or a core. In such implementations, each search feature point can also represent a minutia direction of a minutia that is represented by the search feature point, as shown in the examples depicted in FIGS. 3A-C.

The feature extractor 110 can detect and extract the search feature points 108A within the search image 102 based on using various image processing techniques to identify distinctive points within the search image 102. For example, the feature extractor 110 can process the search image 102 to generate a binary skeleton image, or alternatively, apply one or more image filters to generate a filtered image. In some instances, the feature extractor 110 can apply various object recognition techniques, such as edge and/or boundary detection, curve analysis, colorimetric analysis, among others, to determine whether the search image 102 includes an object of interest. For example, the feature extractor 110 can access an object repository that stores feature points of known objects and compare the search feature points 108A with the feature points of the known objects to determine if one or more known objects are present within the search image 102. As another example, the feature extractor 110 can access a repository that associates certain feature points with object categories to more generally determine whether the search image 102 includes an object of a specified object category.

The search template 108 generated by the feature extractor 110 also includes descriptors 1086 that are associated with each of the search feature points 108A. The descriptors 1086 generally represent various types of information that are associated with a local neighborhood of each of the search feature points 108A. For example, the descriptors 1086 can include one or more of an octant feature vector (OFV), a SIFT descriptor, a LMP descriptor, a wavelet descriptor, or an image patch. In some instances, the descriptors 108B can be used to characterize, for example, local geometric patterns within a neighborhood of a search feature point.

In some instances, the search feature points 108A can be associated with an object that is included in the search image 102. Examples of such objects can include an individual's face, fingerprints, tattoos, objects/products of interest, or any other type of object with discernible visual features that are characterized by the search feature points 108A.

The template comparator 120 obtains reference templates 106A corresponding to the reference images 104A stored within a repository 150A. The repository 150A can represent a local resource of the system 100, such as a hard drive of a server system on which the system 100 is implemented. Alternatively, the repository 150A can represent a networked resource from which the system 100 obtains images to be used for comparing against the search image 102. In such instances, the repository 150A can be associated with an image database of an external third-party, such as a government entity, a data management company, among others. The repository 150A can include publicly available data sources, such as public image databases that openly provide access to cataloged images by search engines, or private image databases that require authorization prior to providing access to stored images.

The repository 150A can store both the reference images 104 and reference templates 106A. For example, the system 100 can generate the reference templates 106A for the reference images 104A using similar techniques discussed above with respect to the search template 108. In such examples, the reference templates 106A can be generated offline prior to the start of a matching operation and stored within the repository 150A for access during a matching operation. Alternatively, in other instances, such as when the repository 150A represents an external data source, the reference templates 106A can be generated online during the matching operation in parallel and/or in relation to the generating the search template 108.

The template comparator 120 compares the search template 108 to each reference template within the reference templates 106A to identify a best-matched reference template 112. A best-matched reference template of our application can refer to any matched template whose matching score is greater than a matched score threshold. For an identification operation, a best-matched template can refer to two fingerprints that are matched if the compared score is greater than the threshold. For similarity matching, the best-matched template can refer to two prints that are similar in the sense of a similarity matching application requirement. In particular, the template comparator 120 can compare the search feature points 108A and their associated descriptors 108B within the search template 108 with reference feature points and their associated descriptors for each reference template included within the reference template 106A. For example, the template comparator 120 can perform comparisons on a template-by-template basis so that the reference feature points and descriptors of each individual reference template are compared against the search feature points 108A and the descriptors 108B.

In some implementations, the template comparator 120 may perform a coarse filtering operation prior to template comparison to reduce the number of reference templates that are individually compared against the search template 108. For example, the template comparator 120 can run a coarse comparison to exclude reference images that are highly unlikely to be match candidates for the search template 108, e.g., a reference template with different global color attributes. Reference templates that do not satisfy the coarse filtering operation are then discarded and prevented from being compared against the search template 108 to conserve computational resources and/or reduce the necessary time to perform template comparisons to identify the best-matched reference template 112.

The template comparator 120 identifies the best-matched reference template 112 based on comparing the search template 108 and the reference templates 106A as discussed above. The best-matched reference template 112 includes reference feature points 112A and reference descriptors 112B that are associated with the reference feature points 112A. The reference feature points 112A and the descriptors 112B can generally represent the same type of data and/or information for the best-matched reference template 112 as the search feature points 108A and the descriptors 108B for the search template 108 as discussed above.

The best-matched reference template 112 can represent a reference template that is most similar to the search template 108 from among the reference templates included in the reference templates 106A. For example, the best-matched reference template 112 can be a reference template that has the greatest number of feature points that are mated with the search feature points 108A, as shown in the examples depicted in FIGS. 3A-C.

In other examples, the best-matched reference template 112 can be a reference template that has the highest likelihood of either including the same object as the object included in the search image 102 or have similar visual attributes as that of the search image 102. In such examples, the template comparator 120 can evaluate the quality of mated feature points of the reference templates 106A to identify the best-matched reference template 112 irrespective of the number of mated reference features points of each reference template. For instance, the template comparator 120 can determine that a first reference template that has a lower number of mated reference feature points than a second reference template is the best-matched reference template 120 because the mated reference feature points of the first image are of higher quality than the mated reference feature points of the second image. The template comparator 120 can determine the quality of mated feature point pair based on comparing their corresponding descriptors to determine a correspondence between them.

The hybrid generator 130 combines the search template 108 and the best-matched reference template 112 to generate a hybrid search template 114. In the example depicted in FIG. 1, the hybrid template generator 130 combines all of the information contained in search template 108 and the best-matched reference template 112 in generating the hybrid search template 114, e.g., each of the search feature points 108A of the search template 108 and each of the reference feature points 112A of the best-matched reference template 112. In this example, the system 100 uses the hybrid search template 114 to identify reference images that are identical to the search image 102 or include objects that are identical to an object within the search image. A typical example of one application of the techniques discussed herein is fingerprint matching. If two fingerprints are matched, the fingerprints are obtained from the same finger, which is represented as an object. The non-matched feature points from the non-matched areas can be included to form the hybrid template to search the remainder of a fingerprint database.

In other examples, the hybrid template generator 130 generates the hybrid search template 114 such that only feature points that are included within mated regions of the search image 102 and a reference image corresponding to the best-matched reference template 112 are combined and included in the hybrid search template 114. With respect to similarity matching, feature points from non-matching areas could not be used for improve matching since the non-matching areas are not related to the search fingerprint object. Therefore, all the feature points in the matched area can be used to form the new template. In such examples, the system 100 uses the hybrid search template 114 to perform a matching operation, e.g., the non-matched points gained from the matched area could enhance the matching the accuracy that a reference image represents a match candidate for the search image 102. As an example, the system 100 can use this type of hybrid search template to perform a matching operation that improve the similarity matching accuracy. In this example, because the matching operation necessitates (i.e., the non-matched area might contain non related objects) a hybrid search template that only includes feature points from mated regions can be used to improve the likelihood that any match candidate has a higher degree of similarity to the search image 102.

In the second matching stage, the template comparator 140 compares the hybrid search template 114 to reference templates that is not the best-matched reference template 112, such as reference templates 106B and 106C. The template comparator 140 can perform template comparisons in a similar manner as discussed above with respect to the template comparator 120 except that the hybrid search template 114 is used as a search image for the purposes of template comparisons. In addition, because the hybrid search template 114 includes both the search feature points 108A and the reference feature points 112A, the number of feature points that can be compared against the reference feature points of additional reference images, such as the reference templates 106B and the reference templates 106C, is increased in comparison to using the search template 108 as the search template, e.g., seven feature points used for template comparison with the hybrid search template as opposed to four feature points with the search template 108.

As discussed above, the additional feature points can the template comparator 140 improve the second stage of the matching operation relative to the first stage. For example, the template comparator 105 can use the additional feature points to reduce the likelihood of determining a false positive match, increase the likelihood of correctly determining a match candidate, or improve the accuracy of match scores that are computed. An example of how the use of additional feature points can be used to improve template matching is discussed in more detail in reference to FIGS. 3A-C.

In the example depicted in FIG. 1, the template comparator 140 performs template comparison using the reference templates 106B and 106C. The reference templates 106B represents templates that are also stored in the repository 150A. For example, the reference templates 106B can include the same reference templates that are included in the reference templates 106A but exclude the best-matched reference template 112.

In some instances, the reference templates 106A and 106B each represent different subsets of reference templates from among a shared collection of reference templates stored within the repository 150A. For example, the reference templates 106A can represent templates that are identified as having a higher quality within the repository 150A compared to the reference templates 106B. In this example, the system 100 uses the reference templates 106A (instead of the reference templates 16B) to identify a best-matched reference template for generating the hybrid search template 114 because the reference templates 106B represent borderline match candidates that are unlikely to be matched to the search template 108 if matched directed to it.

The reference templates 106B represent reference templates that the template comparator 140 obtains from a repository 150B and compared against the hybrid search template 114. The repository 150B can represent a different data source than the repository 150A that stores the reference templates 106A and 106B. The repository 150B can represent a data source that is generally known to include images of lower quality, or store a smaller number of images, which makes their comparison to a search image have lower predictive power compared to comparison to images stored in the repository 150A. For example, the repository 150A can be associated with a restricted government database that stores fingerprints associated with criminal records, whereas the repository 150B can be associated with a fingerprint database that is publicly available over the Internet and not actively maintained or updated.

The template comparator 140 computes match scores for each of the reference templates that are compared to the hybrid search template 114 to generate the match results 116. The match scores can represent an overall likelihood that a particular reference image corresponding to a reference template is a match candidate for the search image 102, e.g., an image that includes the same object as the object included in the search image 102 or an image that is similar to the search image 102.

The template comparator 140 match score using different techniques based on the particular application of the matching operation performed by the system 100. In some implementations, the same reference templates are matched in the first and second stages of the matching operation, then a match score for a particular reference image can be represented as a combined score of the similarity scores determined for the reference template corresponding to the reference images in each stage. For example, the match score for the particular reference image can be an average of a first similarity score determined by the template comparator 120 for the particular reference image after template comparison in the first stage, and a second similarity score determined by the template comparator 140 for the particular reference image after template comparison in the second stage. As another example, the match score can be a weighted average that is computed based on applying respective weighting factors to the first and second similarity scores. In such examples, the weighting factors can be used to bias the match score towards the template comparison of a particular stage of the matching operation. For instance, if the system 100 determines that the template comparison in the second stage is likely to provide a more accurate match result than the template comparison in the first stage, then the match score can be computed based on applying weighting factors that bias the final score toward the similarity score computed based on the template comparison in the second stage.

In other implementations, different collections of reference templates can be compared between successive stages of the matching operation. For example, template comparison using the reference templates 106A can be performed at the first stage, whereas template comparison using the reference templates 106C can be performed at the second stage. In this example, the reference templates 106A and 106C do not include the same reference templates so the match results 116 instead include match scores that are computed for all reference templates that are collectively included in the reference templates 106A and 106C.

In some instances, there may be an overlap between reference templates that are used for comparison between multiple stages. For example, some reference templates can be compared in both the first and second stages of the matching operation while other reference templates may be compared only in either the first or the second stages. In this example, match scores for the reference templates that are compared in multiple stages are represented as a combined similarity score, while match scores for the reference templates that are only compared in a single stage are represented as a single similarity score.

The match results 116 can include a sorted list of match scores that are computed for reference templates that are compared against the search template 108 in one or more of the stages of the matching operation. As discussed above, if the same reference templates are used for template comparison in multiple stages, then the match scores can represent a combined similarity score. Alternatively, if different reference templates are used for template comparison in multiple stages, then the match scores can represent a single similarity score. The match scores can be used by the system 100 to identify a particular reference image that is most likely to represent a match candidate for the search image 102. In the example depicted in FIG. 1, the reference image that is assigned the reference identifier "R001" is identified as the match candidate for the search image 102 because it has a match score value of "0.97," which represents the highest match score value within the match results 116 (and is greater than the pre-matched threshold score). In this example, the system 100 uses the match results 116 to identify a single match candidate from among all reference images having reference templates that are compared against the search template 108.

In some implementations, the match results 116 can be used to identify multiple match candidates. In such implementations, the system 100 can compare the match scores specified within the match results 116 to a predetermined threshold and reference images that have match scores that satisfy the predetermined threshold can be identified as being match candidates for the search image 102.

Figure 2:
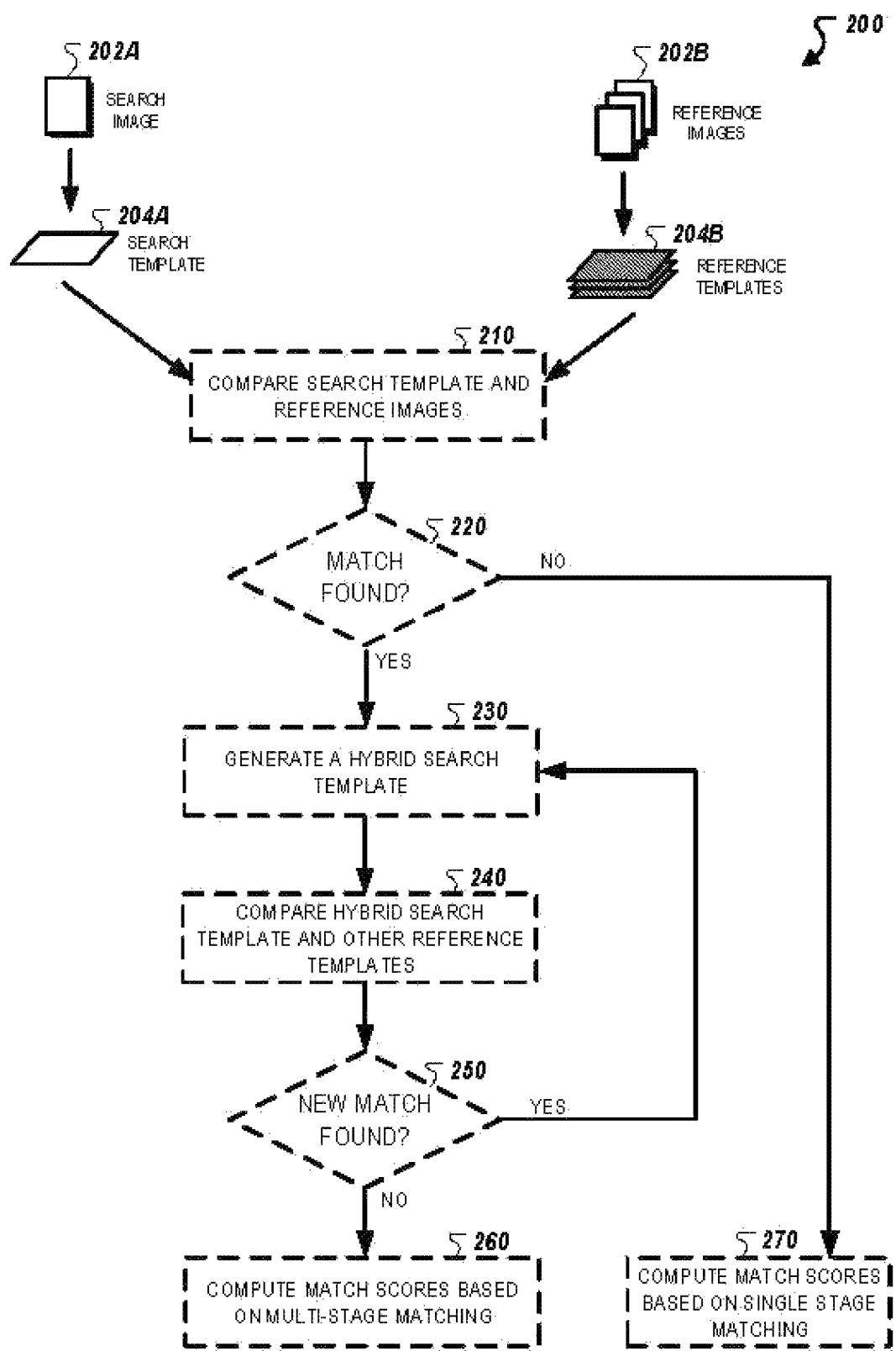
FIG. 2 is a diagram of an example of a multi-stage image matching operation for matching a search image to multiple reference images.

FIG. 2 is a block diagram of an example of a multi-stage image matching process 200. In this example, a search image 202A is compared against reference images 202B to identify one or more match candidates as discussed above.

The process 200 can generally be executed by one or more components of the system 100 that are discussed above and depicted in FIG. 1. For example, the feature extractor 110 can generate a search template 204A for the search image 202A and generate reference templates 204B for the reference images 202B. Additionally, the template comparator 120 can perform steps 210 and 220, the hybrid template generator 130 can perform step 230, and the template comparator 140 can perform steps 240, 250, 260 and 270. However, the descriptions below reference the system 100 generally for simplicity and clarity.

In the example depicted in FIG. 2, the multi-stage image matching process 200 is executed iteratively until no new match candidates for the search template 204A can be identified within the reference templates 204B. The process 200 initially involves identifying a best-matched reference template that matches the search template 204A at step 220. If no such match is found, then the system 100 proceeds to step 270, where the system 100 computes match scores for the reference templates 204B using a typical single stage matching operation. For example, the system 100 compares the search feature points of the search template 204A and the reference feature points of each of the reference templates 204B and computes the match scores based on the comparison.

In the example depicted in FIG. 2, a best-matched reference template can represent a reference template that is identified as satisfying certain matching criteria that causes the system 100 to initiate a new stage (or iteration) of the matching operation. Each iteration of the matching operation can be an individual stage of a matching operation, which represented by steps 230, 240, and 250. The matching criteria can be used to determine whether the system 100 should continue to iteratively match the search image 204A and reference templates using hybrid templates that are newly generated after each iteration, or terminate the last iteration and proceed to computing match scores for the reference templates that are compared in multiple iterations. Example of such matching criteria are having a threshold number of mated reference feature points, or having threshold similarity score.

In more detail, if a best-matched reference template is identified for the search template 204A within the reference templates 204B, the system 100 initiates an iteration of the matching process 200. For example, at step 230, the system 100 generates a hybrid search template based on combining the search template 204A and the best-matched reference template. At step 240, the system 100 compares the hybrid search template and each of the reference templates in the reference templates 204B other than the best-matched reference template. At step 250, the system 100 determines if it has identified yet another best-matched reference template.

If the system 100 does not identify a new best-matched reference template at step 250 (i.e., none of the reference templates satisfy the matching criteria for a best-matched reference template), then the system 100 proceeds to step 260 to compute the match scores for the reference templates that were compared in prior iterations. In the example depicted in FIG. 2, a match score for a particular reference template is computed based on combining the match scores that are computed for the particular reference template in each iteration of the matching operation. For example, if three iterations of the matching operation are performed, then three similarity scores are computed for the particular reference template (assuming that the particular reference template has not been identified as a best-matched reference template in either of the three iterations). In this example, the three similarity scores for the particular reference template are combined to compute the match score for the particular reference.

Alternatively, if the system 100 does identify a new best-matched reference template at step 250 (i.e., a reference template that is not the best-matched reference template for a current iteration satisfies the matching criteria for a best-matched reference template), then the system 100 initiates completes the current iteration and initiates a new iteration by returning to step 230. The system 100 then generates a new hybrid search template for the reference template that satisfies the matching criteria in the current iteration. The new hybrid search template that is generated at step 230 in the new iteration is then used for comparison to other reference templates in the same manner as the prior iteration.

After each iteration, the new hybrid search template that is generated for a new iteration can be generated using different combination techniques. In some implementations, each new hybrid search template is a combination of the search template 204A and the reference template that is determined to satisfy the matching criteria in the prior iteration. Alternatively, in other implementations, each new hybrid search template is a combination of the most recent hybrid search template and the reference template that is determined to satisfy the matching criteria in the prior iteration. In such implementations, each new hybrid search template progressively adds additional feature points with each successive iteration.

In some instances, the system 100 can determine at steps 220 and 250 that multiple reference templates satisfy the matching criteria for a best-matched reference template. In such implementations, the system 100 can select a single reference template to use in generating the hybrid search template, e.g., by selecting a reference template with the greatest number of mated feature points, or by selecting a reference template that has the greatest similarity score. Alternatively, the system 100 can also combine multiple reference templates that satisfy the matching criteria in generating the hybrid search template. For example, if four reference templates are identified as satisfying the matching criteria for a best-matched reference template during the first iteration of the matching operation at step 220, then the system 100 can generate a hybrid search template based on combining the search template 204A and the four reference templates that are identified as satisfying the matching criteria. As another example, if four reference templates are identified as satisfying the matching criteria for a best-matched reference template after the first iteration of the matching operation at step 250, then the four reference templates can be combined with the most recent hybrid search template to generate a new hybrid search template that is to be used in step 240 of a subsequent iteration.

Figure 3A:
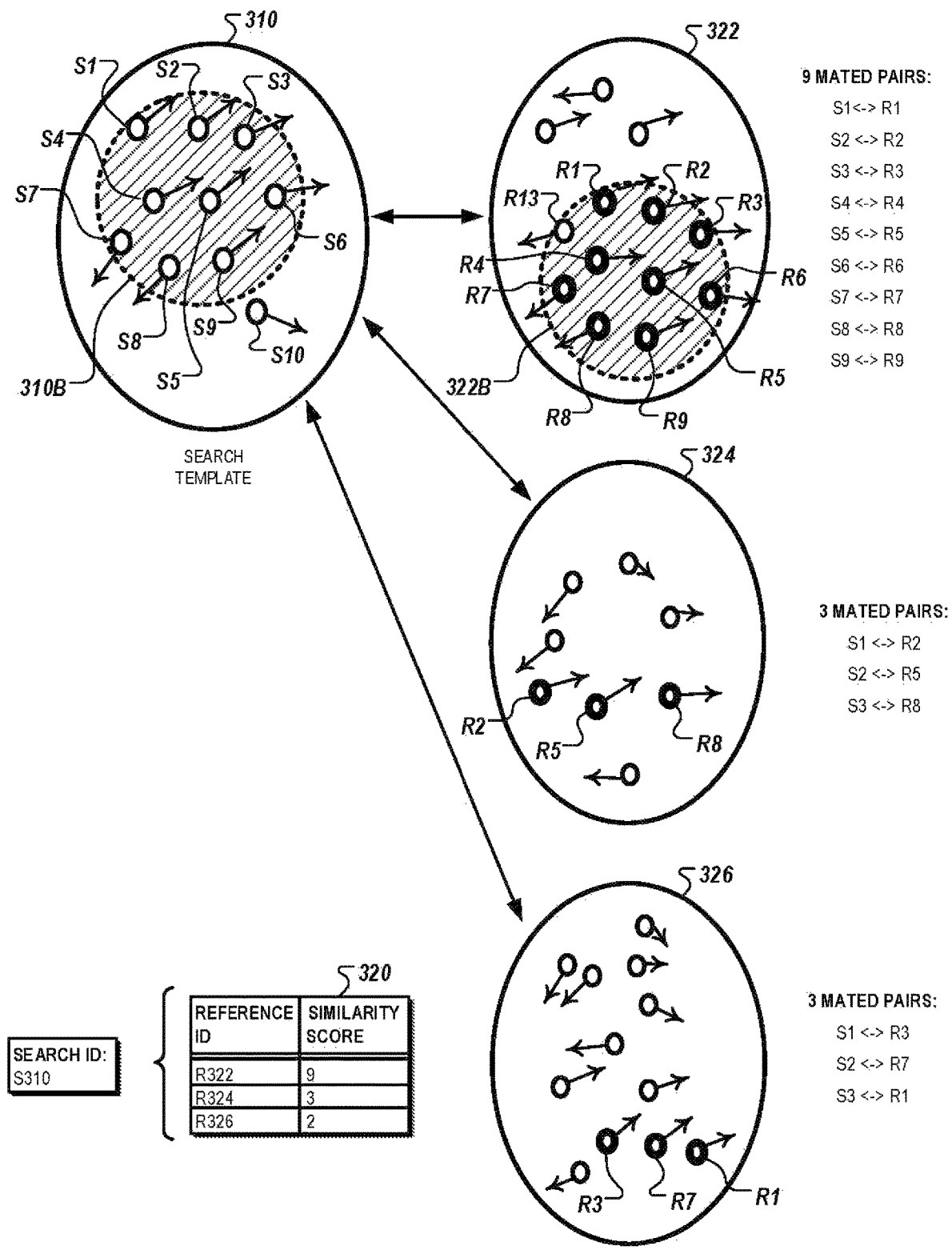
FIGS. 3A-3C are diagrams of examples of multi-stage operations for matching a search image to multiple reference images.
Figure 3B:
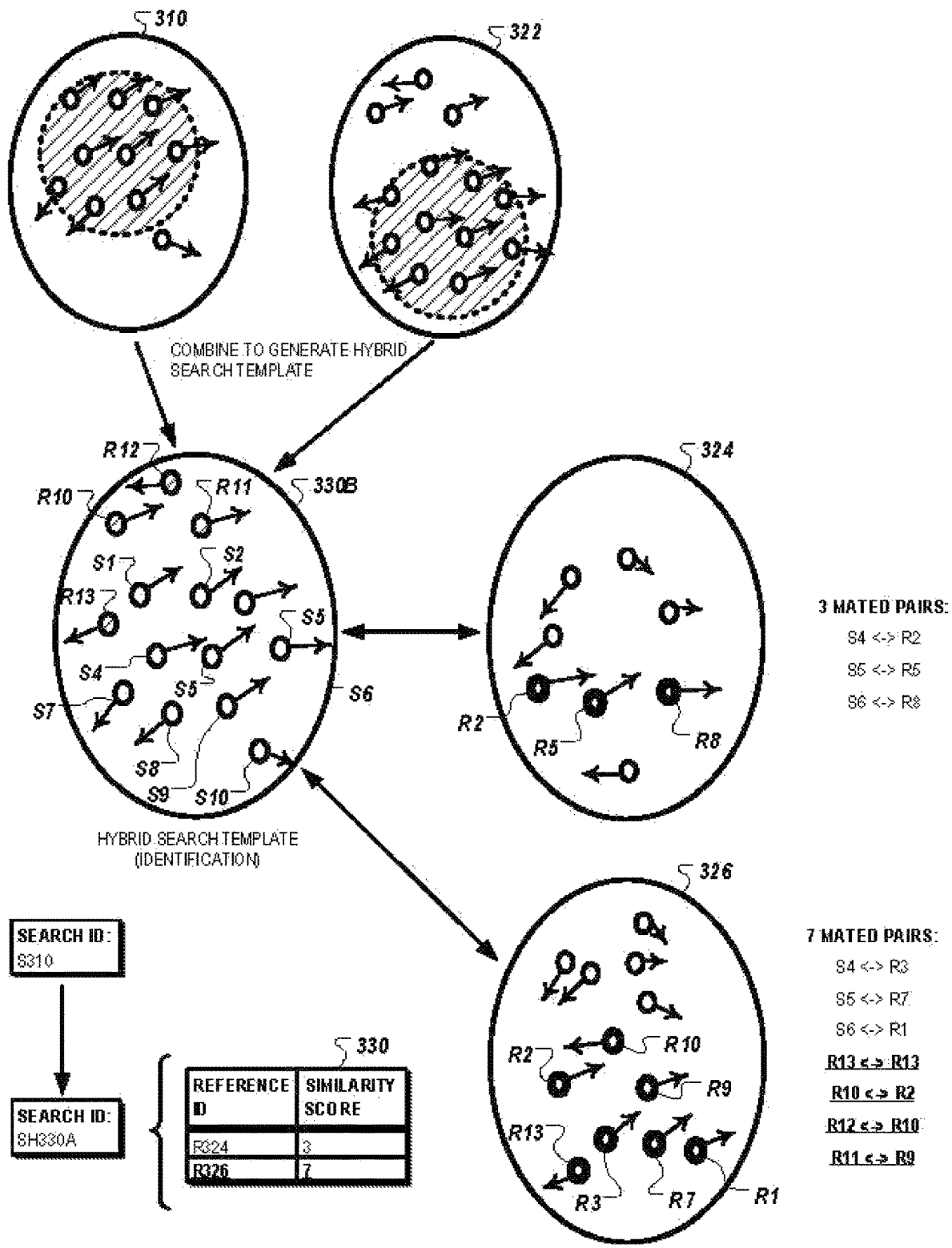
Figure 3C:
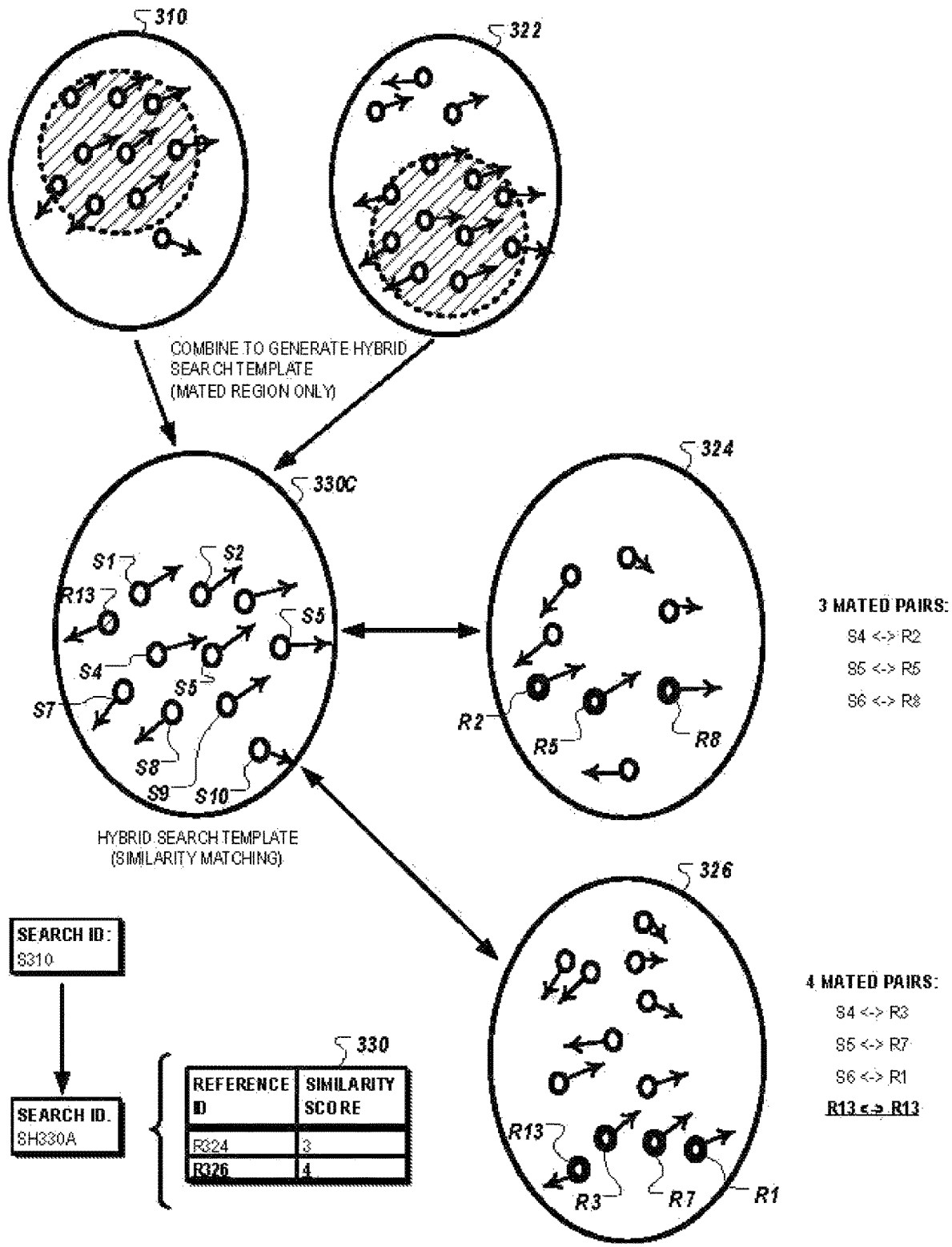

FIGS. 3A-3C are diagrams of examples of multi-stage operations for matching a search image 310 to reference images 322, 324, and 326. As shown in FIG. 3A, the search image 310 represents an image that includes key points from a tattoo image of a user and reference images 322, 324, and 326 each represent the key points of the reference tattoo images that are stored within a tattoo image repository. The search image 310 can be compared against the reference images 322, 324, and 326 for the purposes of tattoo identification or tattoo similarity matching, as discussed in more detail below in reference to FIGS. 3B and 3C.

The matching operation depicted in FIG. 3A can represent a first stage of a matching operation that is continues to either the matching operation depicted in FIG. 3B or 3C. For example, the matching operation depicted in FIG. 3B can be the second stage of a tattoo similarity matching operation, whereas the matching operation depicted in FIG. 3C can be the second stage of a tattoo identification operation.

In general, the matching operations depicted in FIGS. 3A-3C can be generally performed by any type of image recognition system, and more specifically by an automatic tattoo recognition system. In some implementations, the operations can be performed by one or more components of the system 100. For example, one or both of the template comparators 120 and 140 can perform the multi-stage matching operations that are conceptually represented in FIGS. 3A-3C.

Referring initially to FIG. 3A, the search image 310 includes search feature points that each represent a search key point-associated with a search tattoo included in the search image 310. The search image 310 includes ten key points, "S1" through "S10." Each search feature point, in this example, identifies a key point location for a corresponding search key point within the search image 310 and a key point direction of the corresponding search key point that can be determined based local descriptors, such as a SIFT descriptor associated with the corresponding search key point.

The reference images 322, 324, and 326 similarly include reference feature points that each represent a reference key point associated with a corresponding reference tattoo included in the reference images 322, 324, and 326. The reference image 322 includes thirteen key point, the reference image 324 includes eight key points, and the reference image 326 includes twelve key points. As discussed above for the search image 310, each reference feature point, in this example, identifies a key point location for a corresponding reference key point within the reference images 322, 324, and 326, and a key point direction of the corresponding reference key point that can be determined based local descriptors, such as an OFV associated with the corresponding reference key point.

The search image 310 is matched against the each of reference images 322, 324, and 326 to identify mated key pointe pairs between the search image 310 a reference image. In this example, a mated key point pair includes search key point and a reference key point that is determined to correspond to the search key point. The correspondence can be determined based on, for instance, key point type, key point location, the key point direction, local geometric similarities in the neighborhoods of each the search and reference key pointe, or a combination thereof. For example, a reference key point can be determined to correspond to a search key point if it is identified as being the same key point type, has a similar key point direction and has located around similar key points.

In the example depicted in FIG. 3A, nine reference key points are identified within the reference image 322 as representing mated key points (i.e., nine reference key points are determined to have a corresponding search key point within the search image 310). Because of the large number of mated key points, the reference image 322 is considered as the best match print. The area defined by the nine mated key points in the search image 310 and the reference image 322 are identified as representing mated regions. For example, a mated region 310B of the search image 310 includes the nine mated search key points "S1" through "S9," whereas a mated region 322B of the reference image 322 includes the nine mated reference key points "R1" through "R9." Three mated reference key points are identified for the reference image 324 as "R2," "R5," and "R8," and for the reference image 326, the mated reference points are points "R3," "R7," and "R1."

In the example depicted in FIG. 3A, the system 100 computes a similarity score for each reference image based on comparing the search image 310 to the reference images 322, 324, and 326 as discussed above. The similarity scores are included in match results 320 for the search image 310A. In this example, the system assigns values to the similarity scores based on the number of mated reference key points that are identified within each reference image.

As shown, the reference image 322 is assigned a similarity value of "9," and the reference images 322 and 324 are each assigned a similarity value of "3." The system 100, in this example, determines that the reference image 322 is the best-matched reference image because it has the similarity score compared to the reference images 322 and 234. As discussed below, the reference image 322 is combined with the search image 310 to generate a hybrid search image that issued for a second stage matching.

FIG. 3B illustrates an example of generating a hybrid search image 330B to compare against the reference templates 324 and 326 in the second stage of fingerprint verification. The operation depicted in FIG. 3B can follow the operation depicted in FIG. 3A where the reference image 322 is identified as representing the best-matched reference image.

In the example depicted in FIG. 3B, an identification operation refers to matching the search image 310, which has a known identity, to the reference images 322, 324, and 326 to determine if one of the reference images 322, 324, and 326 includes a fingerprint that is included in the search image 310 (and thereby identify the known identity associated with the search image 310).

As shown, the hybrid search image 330B is generated based on combining all of the search feature points of the search image 310 and all of the reference feature points of the reference image 322. The hybrid search image 330B includes feature points that were not identified as being mated in the operation depicted in FIG. 3A, such as the feature point corresponding to key point "R13," as well as feature points that were not identified as being included in the mated regions of the search image 310 and the reference image 322, such as feature points correspond to key points "R10," "R11," and "R12."

The hybrid search image 330B is compared against the reference images 324 and 326 in a similar manner as discussed above with respect to FIG. 3A. In the example, three reference key points are identified within the reference image 324 as representing mated key points, while seven reference key points are identified within the reference image 326 as representing mated key points. In this example, the matching result for the reference image 324 is the same based on whether the search image 310 was used for matching, as is the case with the matching operation depicted in FIG. 3A, or whether the hybrid search image 330B was used for matching, as is the case with the matching operation depicted in FIG. 3B.

However, the matching result for the reference image 326 is different because using the hybrid search image 330B for matching produces an extra mated key point pair that was not previously identified when using the search image 310 for matching. This difference is reflected in match results 330 as a higher similarity score being assigned to the reference image 326 within match results 330 (e.g., "4" as opposed to "3"). This example demonstrates that using a hybrid search image for matching can to increase then number of mated key point pairs that are identified within a reference image because the hybrid search image includes a greater number of reference feature points that can be used for matching. In this example, the identification of the additional key point pair can therefore be used to adjust the match score for the reference image 326 such that the reference image can be identified as being more likely to be a match candidate than the reference image 324. This determination would not have been possible if a single stage matching operation, such as the one depicted in FIG. 3A, were only performed.

FIG. 3C illustrates an example of generating a hybrid search template 330C to compare against the reference templates 324 and 326 for similarity tattoo matching. The operation depicted in FIG. 3C can follow the operation depicted in FIG. 3A where the reference image 322 is identified as representing the best-matched reference image.

In the example depicted in FIG. 3C, tattoo similarity matching refers to matching the search image 310, which finds a similar tattoo, from the reference images 322, 324, and 326, to determine any of the reference images 322, 324, and 326 is similar to the tattoo of the search image (thereby indicating a likelihood that the tattoo associated with the reference image corresponds to the tattoo of the search image 310).

As shown, the hybrid search image 330C is generated based on combining only the search feature points of the search image 310 and the reference feature points of the reference image 322 that are included within mated regions of the search image 310 and the reference image 322. The hybrid search image 330C excludes feature points that were not identified as being mated in the operation depicted in FIG. 3A, such as the feature point corresponding to key point "R13," as well as feature points that were not identified as being included in the mated regions of the search image 310 and the reference image 322, such as feature points correspond to key point "R10," "R11," and "R12."

Compared to the hybrid search image 330B, the hybrid search image 330C includes a smaller number of feature points because similarity matching involves the operation that matches only portion of the area between a search image and a reference image. For instance, because tattoo similarity matching can be used for finding the similar tattoos related to the search image from the reference images.). In the example depicted in FIG. 3C, by excluding feature points representing non-mated key points pairs from the non-mated areas, a matching operation conducted using the hybrid search image 330C can be used to a matching operation conducted using the hybrid search image 330B.

The hybrid search image 330C is compared against the reference images 324 and 326 in a similar manner as discussed above with respect to FIGS. 3A and 3B. In the example, three reference key points are identified within the reference image 322 as representing mated key points, while four reference key pointe are identified within the reference image 322 as representing mated key pointe. In this example, the matching result for the reference image 324 is the same based on whether the search image 310 was used for matching, as is the case with the matching operation depicted in FIG. 3A, or whether the hybrid search image 330B was used for matching, as is the case with the matching operation depicted in FIG. 3B. The matching result for the reference image 326 also produces four mated pairs (as opposed to seven mated pairs for the match result in FIG. 3B) because the hybrid search template 330C only includes key points from the mated region of the search image 310 and the search image 324.

FIGS. 4A-4B are diagrams of examples of different architectures for multi-stage matching operations. Referring initially to FIG. 4A, an example of a sequential architecture 400A for a multi-stage matching operation is depicted. In this example, the matching operation includes four stages that are used to compare a search template 402 to reference templates 424A, 424B, and 424C corresponding respectively to reference images 422A, 422B, and 422C stored within three different repositories 420A, 420B, and 420B.

In some implementations, the repositories 420A, 420B, and 420C can represent independent and distinct data sources that each store images that are determined to be relevant to the search template 402. For example, the repository 420A can be a government identification database, the repository 420B can represent a public records database, and the repository 420C can represent a webpage where images are periodically uploaded by users. In this example, because the images stored within the repositories 420A, 420B, and 420C are associated with different data sources, images obtained from them can be inconsistent with one another, e.g., images can have different qualities, different sizes, resolutions, etc. The application of a multi-stage matching operation, as discussed throughout this document, can therefore be used to address such inconsistencies by generating hybrid search templates that provide a greater number of feature points for template comparison relative to template comparison using only the search template 402.

In other implementations, the repositories 420A, 420B, and 420C can represent different repositories that are associated with the same data source but store different classifications of images relating to the same object and/or subject. For example, the repository 420A can store facial images captured from headshots resulting from incarceration, the repository 420A can store facial images captured from security camera footage of identified incidents, and repository 420C can store facial images captured from public security cameras. In this example, while the repositories 420A, 420B, and 420C are each associated with a government entity, the qualities of images stored within them can vary based on the image capture technique employed. Specifically, the images stored within the repository 420A can be have a higher quality than the images stored within the repository 420B, which then have a higher quality than the images stored within the repository 420C.

In the example depicted in FIG. 4A, reference templates obtained from each individual data source are compared sequentially according to a specified order defined by, for example, quality of images stored within each data source. In this example, each template comparison procedure represents an individual stage of a multi-stage operation.

In particular, in the first stage, a template comparator 410A compares the search template 402 to reference templates 424A obtained from the repository 420A to identify a first best-matched reference template (not shown). The first best-matched template is then combined with the search template 402 to generate a hybrid search template 404A, which is then used as a search image to be compared in the second stage.

In the second stage, a template comparator 410B compares the hybrid search template 404A to reference templates 424B obtained from the repository 420B to identify a second best-matched reference template (not shown). The second best-matched template is then combined with the hybrid search template 404A to generate a hybrid search template 404B, which is then used as a search image to be compared in the third stage.

In the third stage, a template comparator 410C compares the hybrid search template 404B to reference templates 424C obtained from the repository 420C to identify a third best-matched reference template (not shown). The third best-matched template is then combined with the hybrid search template 40B to generate a hybrid search template 404C, which is then used as a search image to be compared in the third stage.

In the fourth stage, a template comparator 410D compares the hybrid search template 404C to other reference templates 426A, 426B, and 426C obtained from the repositories 420A, 420B, and 420C, respectively. The other reference templates 426A, 426B, and 426C can include reference templates in the reference templates 424A, 424B, and 424C, respectively, excluding the best-matched reference templates that are used to generate hybrid search templates 404A, 404B, and 404C.

After performing the template comparisons, the template comparator 410D computes match scores for the references templates 426A, 426B, and 426C using techniques similar to those discussed above. The match scores are identified in the match results 116.

In the example depicted in FIG. 4A, each stage of the matching operation is based on identifying a best-matched reference template from a different repository, and generating a different hybrid search template. As discussed above, if the different repositories store images having different quality metrics, the order in which matching is performed can be used to improve the accuracy and/or reliability of performing template comparisons with lower quality images.

Referring now to FIG. 4B, an example of a parallel architecture 400B for a multi-stage matching operation is depicted. In this example, the matching operation includes two stages that are used to compare a search template 452 to reference templates 474A, 474B, and 474C corresponding respectively to reference images 472A, 472B, and 472C stored within three different repositories 470A, 470B, and 470B.

The repositories 470A, 470B, and 470C can represent independent and distinct data sources that each store images that are determined to be relevant to the search template 402, or alternatively, different repositories that are associated with the same data source but store different classifications of images relating to the same object and/or subject, in a manner similar to the repositories 420A, 420B, and 420C discussed above.

In the example depicted in FIG. 4B, reference templates obtained from each individual data source are compared in parallel according without any specified order. In this example, the first stage of the multi-stage operation, a template comparator 460A compares the reference templates 474A, 474B, and 474C to the search template 452 to identify best-matched templates with respect to each set of reference templates for each data source. For example, a best matched-reference template 454A is identified for the reference templates 474A, a best matched-reference template 454B is identified for the reference templates 474B, and a best matched-reference template 454C is identified for the reference templates 474C. The template comparator then combines the best-matched reference templates 454A, 454B, and 454C to generate a single hybrid search template 456 with respect to all of the compared reference templates.

In the second stage, a template comparator 460B compares the hybrid search template 456 to other reference templates 476A, 476B, and 476C obtained from the repositories 470A, 470B, and 470C, respectively. The other reference templates 476A, 476B, and 476C can include reference templates in the reference templates 474A, 474B, and 474C, respectively, excluding the best-matched reference templates that are used to generate hybrid search template 456.

After performing the template comparisons, the template comparator 460B computes match scores for the references templates 476A, 476B, and 476C using techniques similar to those discussed above. The match scores are identified in the match results 166.

Figure 5:
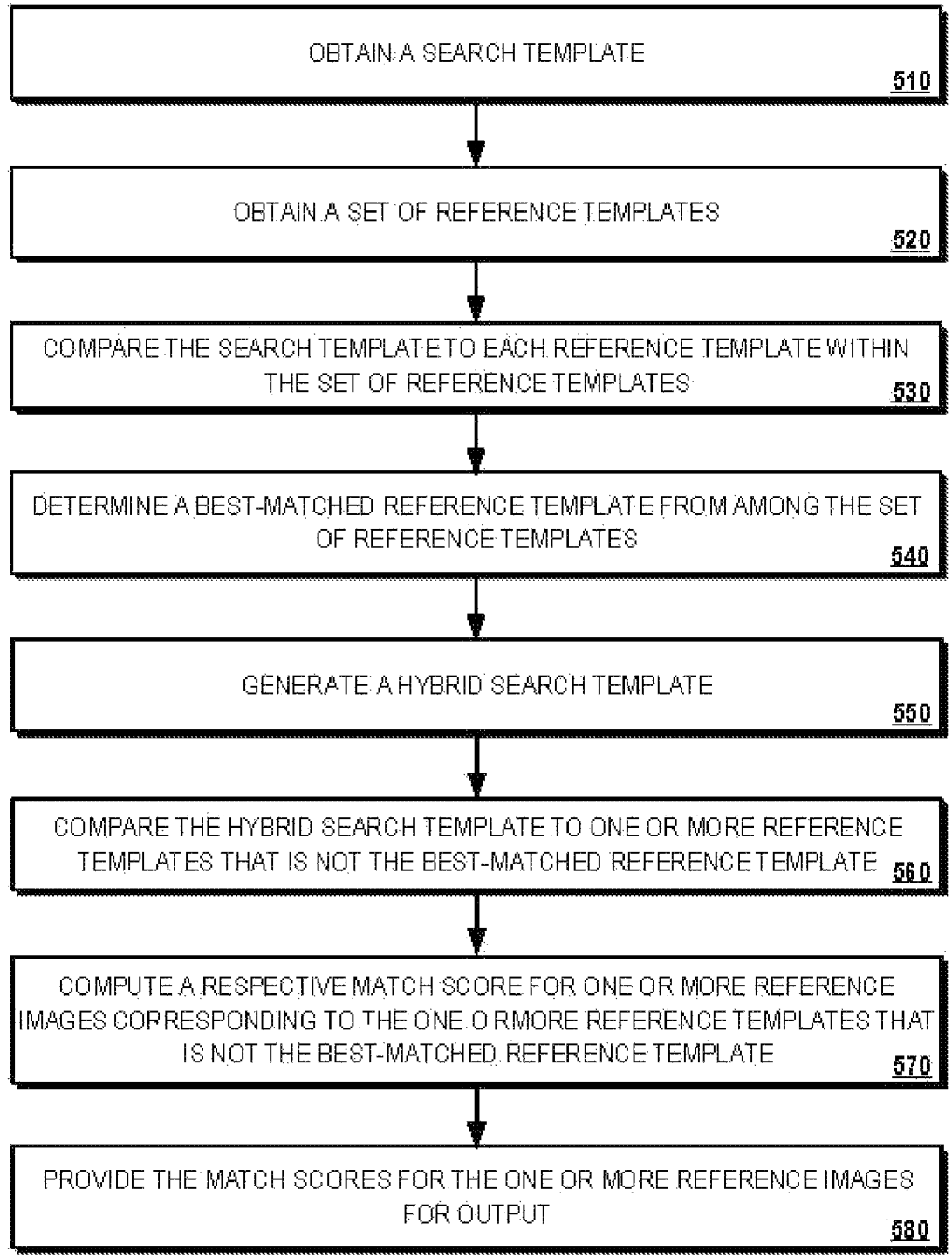
FIG. 5 is a flowchart for an example of a process for iteratively matching a search image to multiple reference images.

FIG. 5 is a flowchart for an example of a process 500 for iteratively matching a search image to multiple reference images. Briefly, the process 500 can include the operations of obtaining a search template (510), obtaining a set of reference templates (520), comparing the search template to each reference template within the set of reference templates (530), determining a best-matched reference template from among the set of reference templates (540), generating a hybrid search template (550), comparing the hybrid search template to one or more reference templates that is not the best-matched reference template (560), computing a respective match score for one or more reference images corresponding to the one or more reference templates that is not the best-matched reference template (570), and providing the match scores for the one or more reference images for output (580).

In general, the process 500 is discussed in reference to the system 100, although any image recognition system can be configured to perform the operations of the process 500. In some implementations, the operations of the process 500 can be performed by one or more components of the system 100, such as the feature extractor 110, the template extractor 120, the hybrid template generator 130, and/or the template comparator 140, which are discussed above in reference to FIG. 1.

In more detail, the process 500 can include the operation of obtaining a search template (510). For example, the template comparator 120 can obtain the search template 108. As discussed above with respect to FIG. 1, the search template 108 can include search feature points 108A within the search image 102, and search descriptors 108B for each of the search feature points 108A. The search template 108 can be generated by the feature extractor 110 based on identifying, for example, distinctive points within the search image 102 that can be used to compare against reference images.

The process 500 can include the operation of obtaining a set of reference templates (520). For example, the template comparator 120 can obtain the reference templates 106A. As discussed above with respect to FIG. 1, each reference template within the reference templates 106A can include reference feature points within a corresponding reference image, and reference descriptors for each of the reference feature points of the corresponding reference image. The reference templates 106A can be generated offline and stored in the repository 150A prior to the start of a matching operation, or alternatively, generated online during the matching operation by the either template 120 or a component that is logically or physically separate from the system 100, e.g., a separate server system that is configured to generate the reference templates 106A.

Examples of the search feature points 108A or the reference feature points within the reference templates 106A can include one or more of a ridge intersection point, a ridge edge point, or a corner point.

The process 500 can include the operation of comparing the search template to each reference template within the set of reference templates (530). For example, the template comparator 120 can compare the search template 108 and each reference template within the reference templates 106A. In particular, as discussed above with respect to FIG. 1, comparing the search template 108 to each reference template within the reference templates 106A can include the following operations that are performed by the template comparator 120. For example, the template comparator 120 can compare each search feature point of the search template 108 to each reference feature point of each reference template within the reference templates 106A. The template comparator 120 can then determine a number of mated feature points for each reference template within the reference templates 106A. As discussed above with respect to FIG. 1, each mated feature point can represent a reference feature point that has one or more reference descriptors that correspond to a search descriptor of a particular search feature point.

The process 500 can include the operation of determining a best-matched reference template from among the set of reference templates (540). For example, the template comparator 120 can determine a best-matched reference template 112 from among the reference templates 106A based on the comparison performed in step 530. As discussed above, the best-matched reference template 112 based on various criteria, such as a number of mated reference feature points. For example, in some implementations, the best-matched reference template 112 is a reference template that is determined to have the greatest number of mated feature points from among the reference templates 106A.

The process 500 can include the operation of generating a hybrid search template (550). For example, the hybrid template generator 130 can combine one or more reference feature points of the best-matched reference template 112 and one or more search feature points of the search template 108 to generate the hybrid search template 114. As discussed above with respect to FIG. 1, the hybrid template generator 130 cam generate the hybrid search template 114 using different techniques based on the particular type of image matching operation being performed using the search image 102.

In some implementations, the hybrid template generator 130 generates the hybrid search template 114 for use in a matching procedure to identify reference images that include the similar object as an object included in the search image 102. For example, a search image that includes a particular tattoo of a known individual can be matched against other tattoo images in an identification database to identify affiliated individuals that have similar tattoos, e.g., gang members that have a gang-related tattoo. In such implementations, the hybrid search template 114 is generated based on combining each reference feature point of the best-matched reference template 112 and each search feature point of the search template.

Alternatively, in other implementations, the hybrid template generator 130 can generate the hybrid search template 114 for use in a verification procedure to identify reference images that include the same object as an object included in the search image 102. For example, a search image of the face of an unknown individual can be matched against other facial images in an identification database to identify a reference image that includes the same individual. In such implementations, the hybrid template generator 130 generates the hybrid search template 114 is generated based on combining search feature points included within a mated region of the search image 102 and reference feature points included within a mated region of a reference image. FIG. 3A illustrates an example of a mated region 3106 of the search image 310 and a mated region 322B of the reference image 322.

For instance, the hybrid template generator 130 compares each search feature point within the search image 102 to each reference feature point within a reference image corresponding to the best-matched reference template 112. The hybrid template generator 130 then determines a mated region of the reference image corresponding to the best-matched reference template. As discussed above with respect to FIG. 3A, the mated region of the reference image 322 is defined by an area of the reference image that includes reference feature points having one or more reference descriptors that correspond to a search descriptor of a particular search feature point. For example, as depicted in FIG. 3A, the mated region 322B of the reference image 322 includes nine reference feature points that have corresponding search feature points in the mated region 310B of the search image 310.

As discussed above with respect to FIG. 3, the hybrid template generator 130 also determines the mated region 3106 of the search image 310 based on the mated region 322B of the reference image 322. The hybrid template generator 130 combines the search feature points in the mated region 3106 of the search image 302 and the reference feature points in the mated region 322B of the reference image 322 to generate the hybrid search template for the hybrid search image 330C. For example, as depicted in FIGS. 3A and 3C, feature points that are only included in the mated regions 3106 and 322B of the search image 310 and the reference image 322, respectively, are combined and included in the hybrid search image 330C.

The process 500 can include the operation of comparing the hybrid search template to one or more reference templates that is not the best-matched reference template (560). For example, the template comparator 140 can compare the hybrid search template 114 to one or more reference templates that is not the best-matched reference template 112, such as the reference templates 106B and/or 106c. In some implementations, the one or more reference templates that is not best-matched reference template includes the reference templates 106b that are included within the reference templates 106A that are compared to the search template 102.

Alternatively, in other implementations, the one or more reference templates that is not best-matched reference template includes reference templates included within a second set of reference templates, such as the reference templates 106C. As discussed above with respect to FIG. 1, the reference templates 106C can be associated with data source that is distinct and independent from a data source of the reference templates 106A that are compared to the search template 102. For example, the reference templates 106C are obtained from the repository 150B while the reference templates 106A are obtained from the repository 150A The process 500 can include the operation of computing a respective match score for one or one or more reference images corresponding to the one or more reference templates that is not the best-matched reference template (570). For example, the template comparator 150 can compute a respective match score for one or more reference images corresponding to the one or more reference templates as discussed in step 560. As discussed above with respect to FIG. 1, the template comparator 140 can compute the match scores based on the comparison that is performed in step 560. The computed match scores are included in the match results 116.

The process 500 can include the operation of providing the match scores for the one or more reference images for output (580). For example, the template comparator 140 can provide the match results 116 including the match scores for output to another image recognition system, such as a tattoo recognition system, a fingerprint recognition, etc., or for output to a user that is performing an image matching operation.

As discussed above, in some implementations, the hybrid search template is used in matching procedure to identify reference images that include the same object as an object included in the search image. In such implementations, the search image is an image of an object. For example, the object can represent a face of an individual, a tattoo on a skin surface, an item or product of interest, among others. The search feature points can include search feature points characterizing visual attributes of the object. For example, the search feature points can include a color, texture, shape, location and/or edges of the object. The match scores can each represent a likelihood that a reference image corresponding to the one or more reference templates is an image of the object. For example, if the search image is an image of a particular pair of headphones, then the match score computed for a reference image can represent a likelihood that the reference image is also an image of the same pair headphones.

Alternatively, in other implementations, the hybrid search template is generated for use in a matching procedure to identify reference images that include an object that is similar to and/or associated with the object included in the search image. In such implementations, the search image includes an image of a first object, and the search feature points include search feature points that characterize visual attributes of the first object. The match scores, in such implementations, each represent a likelihood that a reference image is an image of a second object that is predetermined to be similar to the first object. For example, the search image is an image of a pair of headphones, the match score computed for a reference image can represent a likelihood that the reference image is also an image of a similar type of object, such as audio playback devices, audio output devices, etc.

Figure 6:
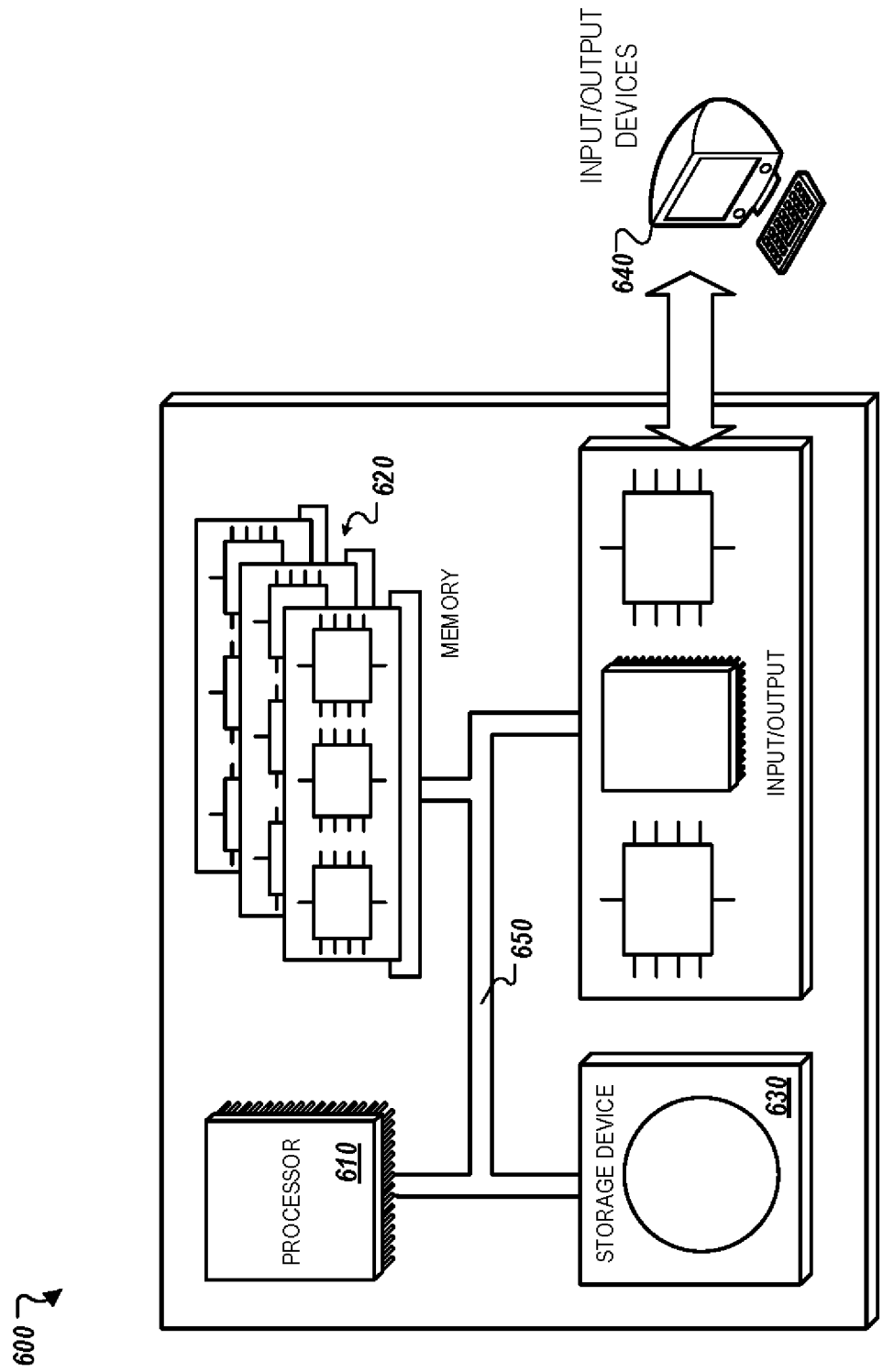
FIG. 6 is a block diagram of computing devices on which the processes described herein, or portions thereof, may be implemented.

FIG. 6 is a block diagram of a computer system 600. The system 600 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 640. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   obtaining a search template comprising (i) search feature points within a search image, and (ii) search descriptors for each of the search feature points;
   obtaining a set of reference templates, each reference template within the set of reference templates comprising (i) reference feature points within a particular reference image, and (ii) reference descriptors for each of the reference feature points;
   comparing the search template to each reference template within the set of reference templates;
   determining a best-matched reference template from among the set of reference templates based on comparing the search template to each reference template within the set of reference templates;
   combining one or more reference feature points of the best-matched reference template and one or more search feature points of the search template to generate a hybrid search template;
   comparing the hybrid search template to one or more reference templates that is not the best-matched reference template;
   computing a respective match score for one or more reference images corresponding to the one or more reference templates that is not the best-matched reference template based on comparing the hybrid search template to the one or more reference templates that is not best-matched reference template; and
   providing the match scores for the one or more reference images for output.

2. The method of claim 1, wherein comparing the search template to each reference template within the set of reference templates comprises:
   comparing each search feature point of the search template to each reference feature point of each reference template within the set of reference templates; and
   determining, for each reference template within the set of reference templates, a number of mated feature points based on comparing each search feature point of the search template to each reference feature point of each reference template within the set of reference templates, each mated feature point representing a particular reference feature point having one or more reference descriptors that correspond to a search descriptor of a particular search feature point.

3. The method of claim 2, wherein the best-matched reference template is a particular reference feature template that is determined to have the greatest number of mated feature points from among the reference templates within the set of reference feature templates.

4. The method of claim 1, wherein the hybrid search template is generated based on combining each reference feature points of the best-matched reference template and each search feature point of the search template.

5. The method of claim 1, wherein generating the hybrid search template comprises:
   comparing each search feature point within the search image to each reference feature point within a reference image corresponding to the best-matched reference template;
   determining a mated region of the reference image corresponding to the best-matched reference template based on comparing each search feature point within the search image to each reference feature point within the reference image corresponding to the best-matched reference template, the mated region of the reference image defined by an area of the reference image that includes reference feature points having one or more reference descriptors that correspond to a search descriptor of a particular search feature point;
   determining a mated region of the search image based on the mated region of the reference image, the mated region of the search image defined by an area of the search image that includes search feature points having one or more search descriptors that correspond to a reference descriptor of a particular reference feature point; and
   combining search feature points included within the mated region of the search image and reference feature points included within the mated region of the reference image to generate the hybrid search template.

6. The method of claim 1, wherein the one or more reference templates that is not best-matched reference template comprises reference templates included within the set of reference templates that are compared to the search template.

7. The method of claim 1, wherein the one or more reference templates that is not best-matched reference template comprises reference templates included within a second set of reference templates, the second set of reference templates being associated with a different data source than a data source of the set of reference templates that are compared to the search template.

8. The method of claim 1, wherein the search feature points or the reference feature points comprises one or more of a ridge intersection point, a ridge edge point, or a corner point.

9. The method of claim 1, wherein:
   the search image comprises an image of an object;
   the search feature points comprise search feature points characterizing visual attributes of the object; and
   the match scores each represent a likelihood that a reference image corresponding to the one or more reference templates is an image of the object.

10. The method of claim 1, wherein:
    the search image comprises an image of a first object;
    the search feature points comprise search feature points characterizing visual attributes of the first object; and
    the match scores each represent a likelihood that a reference image corresponding to the one or more reference templates is an image of a second object that is predetermined to be similar to the first object.

11. A system comprising:
    one or more computers; and
    one or more storage devices storing instructions that, when executed by the one or more computers, cause the one or more computers to perform operations comprising:
    obtaining a search template comprising (i) search feature points within a search image, and (ii) search descriptors for each of the search feature points;
    obtaining a set of reference templates, each reference template within the set of reference templates comprising (i) reference feature points within a particular reference image, and (ii) reference descriptors for each of the reference feature points;
    comparing the search template to each reference template within the set of reference templates;
    determining a best-matched reference template from among the set of reference templates based on comparing the search template to each reference template within the set of reference templates;
    combining one or more reference feature points of the best-matched reference template and one or more search feature points of the search template to generate a hybrid search template;
    comparing the hybrid search template to one or more reference templates that is not the best-matched reference template;
    computing a respective match score for one or more reference images corresponding to the one or more reference templates that is not the best-matched reference template based on comparing the hybrid search template to the one or more reference templates that is not best-matched reference template; and
    providing the match scores for the one or more reference images for output.

12. The system of claim 11, wherein comparing the search template to each reference template within the set of reference templates comprises:
    comparing each search feature point of the search template to each reference feature point of each reference template within the set of reference templates; and
    determining, for each reference template within the set of reference templates, a number of mated feature points based on comparing each search feature point of the search template to each reference feature point of each reference template within the set of reference templates, each mated feature point representing a particular reference feature point having one or more reference descriptors that correspond to a search descriptor of a particular search feature point.

13. The system of claim 12, wherein the best-matched reference template is a particular reference feature template that is determined to have the greatest number of mated feature points from among the reference templates within the set of reference feature templates.

14. The system of claim 11, wherein the hybrid search template is generated based on combining each reference feature points of the best-matched reference template and each search feature point of the search template.

15. The system of claim 11, wherein generating the hybrid search template comprises:
    comparing each search feature point within the search image to each reference feature point within a reference image corresponding to the best-matched reference template;
    determining a mated region of the reference image corresponding to the best-matched reference template based on comparing each search feature point within the search image to each reference feature point within the reference image corresponding to the best-matched reference template, the mated region of the reference image defined by an area of the reference image that includes reference feature points having one or more reference descriptors that correspond to a search descriptor of a particular search feature point;

determining a mated region of the search image based on the mated region of the reference image, the mated region of the search image defined by an area of the search image that includes search feature points having one or more search descriptors that correspond to a reference descriptor of a particular reference feature point; and combining search feature points included within the mated region of the search image and reference feature points included within the mated region of the reference image to generate the hybrid search template.

16. A non-transitory computer-readable storage device encoded with computer program instructions that, when executed by one or more computers, cause the one or more computers to perform operations comprising:

obtaining a search template comprising (i) search feature points within a search image, and (ii) search descriptors for each of the search feature points;

obtaining a set of reference templates, each reference template within the set of reference templates comprising (i) reference feature points within a particular reference image, and (ii) reference descriptors for each of the reference feature points;

comparing the search template to each reference template within the set of reference templates;

determining a best-matched reference template from among the set of reference templates based on comparing the search template to each reference template within the set of reference templates;

combining one or more reference feature points of the best-matched reference template and one or more search feature points of the search template to generate a hybrid search template;

comparing the hybrid search template to one or more reference templates that is not the best-matched reference template;

computing a respective match score for one or more reference images corresponding to the one or more reference templates that is not the best-matched reference template based on comparing the hybrid search template to the one or more reference templates that is not best-matched reference template; and providing the match scores for the one or more reference images for output.

17. The device of claim 16, wherein comparing the search template to each reference template within the set of reference templates comprises:

comparing each search feature point of the search template to each reference feature point of each reference template within the set of reference templates; and determining, for each reference template within the set of reference templates, a number of mated feature points based on comparing each search feature point of the search template to each reference feature point of each reference template within the set of reference templates, each mated feature point representing a particular reference feature point having one or more reference descriptors that correspond to a search descriptor of a particular search feature point.

18. The device of claim 17, wherein the best-matched reference template is a particular reference feature template that is determined to have the greatest number of mated feature points from among the reference templates within the set of reference feature templates.

19. The device of claim 16, wherein the hybrid search template is generated based on combining each reference feature points of the best-matched reference template and each search feature point of the search template.

20. The device of claim 16, wherein generating the hybrid search template comprises:

comparing each search feature point within the search image to each reference feature point within a reference image corresponding to the best-matched reference template;

determining a mated region of the reference image corresponding to the best-matched reference template based on comparing each search feature point within the search image to each reference feature point within the reference image corresponding to the best-matched reference template, the mated region of the reference image defined by an area of the reference image that includes reference feature points having one or more reference descriptors that correspond to a search descriptor of a particular search feature point;

determining a mated region of the search image based on the mated region of the reference image, the mated region of the search image defined by an area of the search image that includes search feature points having one or more search descriptors that correspond to a reference descriptor of a particular reference feature point; and combining search feature points included within the mated region of the search image and reference feature points included within the mated region of the reference image to generate the hybrid search template.

* * * * *